US012624270B2

(12) United States Patent
Hironaka et al.

(10) Patent No.: US 12,624,270 B2
(45) Date of Patent: May 12, 2026

(54) SILICONE COMPOSITION AND A THERMALLY CONDUCTIVE SILICONE CURED PRODUCT HAVING HIGH THERMAL CONDUCTIVITY

(71) Applicant: Shin-Etsu Chemical Co., Ltd., Tokyo (JP)

(72) Inventors: Yuya Hironaka, Annaka (JP); Yasuhisa Ishihara, Annaka (JP); Katsuyuki Tanaka, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 719 days.

(21) Appl. No.: 18/002,107

(22) PCT Filed: Jun. 11, 2021

(86) PCT No.: PCT/JP2021/022253

§ 371 (c)(1),
(2) Date: Dec. 16, 2022

(87) PCT Pub. No.: WO2021/256391

PCT Pub. Date: Dec. 23, 2021

(65) Prior Publication Data

US 2023/0227708 A1 Jul. 20, 2023

(30) Foreign Application Priority Data

Jun. 18, 2020 (JP) ................................ 2020-105089

(51) Int. Cl.

| | |
|---|---|
| ***C09K 5/14*** | (2006.01) |
| ***C08G 77/12*** | (2006.01) |
| ***C08G 77/20*** | (2006.01) |
| ***C08K 3/22*** | (2006.01) |
| ***C08K 3/28*** | (2006.01) |
| ***C08K 7/18*** | (2006.01) |
| ***C08K 13/04*** | (2006.01) |

(52) U.S. Cl.

CPC ................ *C09K 5/14* (2013.01); *C08G 77/12* (2013.01); *C08G 77/20* (2013.01); *C08K 13/04* (2013.01); *C08K 2003/2227* (2013.01); *C08K 2003/282* (2013.01); *C08K 7/18* (2013.01); *C08K 2201/001* (2013.01); *C08K 2201/005* (2013.01); *C08K 2201/014* (2013.01)

(58) Field of Classification Search

CPC .......... C09K 5/14; C08G 77/12; C08G 77/20; C08K 13/04; C08K 7/18; C08K 2003/2227; C08K 2003/282; C08K 2201/001; C08K 2201/005; C08K 2201/014; C08K 3/22; C08K 3/28; C08K 5/5419; C08K 9/06; C08L 83/04; C08L 83/06

See application file for complete search history.

(56) References Cited

U.S. PATENT DOCUMENTS

| | | | | |
|---|---|---|---|---|
| 5,011,870 | A | 4/1991 | Peterson | |
| 5,344,635 | A | 9/1994 | Bujard et al. | |
| 2019/0256756 | A1* | 8/2019 | Ishihara ................ | C08K 13/04 |
| 2019/0292349 | A1 | 9/2019 | Ito | |
| 2021/0147681 | A1 | 5/2021 | Hirakawa et al. | |
| 2022/0220354 | A1 | 7/2022 | Ishihara et al. | |

FOREIGN PATENT DOCUMENTS

| | | | |
|---|---|---|---|
| CN | 109312159 | A | 2/2019 |
| JP | H0314873 | A | 1/1991 |
| JP | H0624715 | A | 2/1994 |
| JP | 2004091743 | A | 3/2004 |
| JP | 2005054099 | A | 3/2005 |
| JP | 4357064 | B2 | 8/2009 |
| JP | 6246986 | B1 | 11/2017 |
| WO | 2018074247 | A1 | 4/2018 |
| WO | 2020116057 | A1 | 6/2020 |

OTHER PUBLICATIONS

English translation of International Search Report corresponding to International Patent Application No. PCT/JP2021/022253 (2 pages) (mailed Jul. 20, 2021).

* cited by examiner

*Primary Examiner* — Andrew J. Oyer
(74) *Attorney, Agent, or Firm* — Myers Bigel, P.A.

(57) ABSTRACT

One of the objects the present invention to provide a cured product of a thermally conductive silicone composition having high thermal conductivity and excellent compressibility. A silicone composition comprising an organo(poly) siloxane and a thermally conductive filler, wherein the organo(poly)siloxane comprises at least one curable organo (poly)siloxane, the thermally conductive filler comprises (B-i) unsintered aluminum nitride having an average particle size of 20 μm or more and 120 μm or less and (B-ii) alumina having an average particle size of 0.1 μm or more and 5 μm or less, the (B-ii) alumina comprises spherical alumina with 25 to 80 mass % of the spherical alumina, based on a total mass of the component (B-ii), a proportion of the component (B-ii) is 25 to 50 mass %, based on a total mass of the components (B-i) and (B-ii), and a proportion of a volume of the thermally conductive filler is 80 to 90 volume %, based on a total volume of the silicone composition.

16 Claims, No Drawings

SILICONE COMPOSITION AND A THERMALLY CONDUCTIVE SILICONE CURED PRODUCT HAVING HIGH THERMAL CONDUCTIVITY

TECHNICAL FIELD

The present invention relates to a silicone composition that provides a thermally conductive silicone-cured product having high thermal conductivity.

BACKGROUND OF THE INVENTION

As further progress is made in making electronic equipment smaller and more highly integrated, the impact of heat generated from electronic components such as power semiconductors and memory is becoming more serious than ever. When heat accumulates in an electronic component, the temperature of the electronic component rises, which can potentially cause operational failure or breakdown. Many heat dissipation methods and heat dissipation members to be used in these methods have been proposed to efficiently release the heat generated from electronic components to a cooling member, such as a heat sink.

Conventionally, heat sinks that employ a metal plate having high thermal conductivity, such as one made of aluminum or copper, have been used in electronic equipment to suppress a rise in temperature of an element during operation. This kind of heat sink carries away heat generated by the element and discharges the heat from surfaces due to the difference in temperature with the air outside.

In a case where heating elements are directly brought in contact with a heat sink, air present on an interface there between obstructs thermal conduction, therefore the heat sink needs to be arranged in close vicinity of the elements. Due to differences in height and a tolerance for assembly among elements, a sheet or a grease having flexibility and thermal conductivity is used.

Sheets are superior to grease in handleability, and thermally conductive sheets formed of thermally conductive resin have been used in various fields.

In the field of in-vehicle devices, long-term reliability at temperatures in the region of approximately −40° C. at the low end in cold areas and temperatures as high as 150° C. or more of a heat generating member is required. Furthermore, in many cases, flame retardance, electrical insulation, and the like are also required. Silicone is suitable as a resin having all these characteristics, and a sheet of thermally conductive silicone comprising a silicone and a thermally conductive filler is used.

Thermally conductive silicone sheets are often used in cases where there is some space between the heating elements and a cooling member such as a heat sink or a housing. In many cases it is necessary to ensure that the space is electrically insulated, with the thermally conductive sheet often required to be insulating as well. Consequently, metal particles such as aluminum, copper, and silver cannot be used as the thermally conductive filler, and an insulating thermally conductive filler such as aluminum hydroxide or alumina is often used. However, aluminum hydroxide and alumina have low thermal conductivity by themselves, so that a thermally conductive silicone composition using this kind of thermally conductive filler will have lower thermal conductivity.

Recently, heat generated by electronic components has been increasing. Thermally conductive sheets are also required to be have higher thermal conductivity, and aluminum hydroxide and alumina alone cannot sufficiently meet this requirement as a thermally conductive filler. Therefore, the use of boron nitride and aluminum nitride as a highly thermally-conductive filler has been attracting attention. Common scaly boron nitride has a layered crystal structure and exhibits anisotropic thermal conductivity due to a significant difference in thermal conductivity between the surface direction and lamination direction of the crystals. In contrast, aluminum nitride has a wurtzite crystal structure. Therefore, aluminum nitride does not exhibit extreme anisotropy like boron nitride.

Accordingly, various heat dissipation materials for which aluminum nitride has been selected as the highly thermally-conductive filler have been disclosed in Patent Literature 1 (JP H03-14873 A) and Patent Literature 2 (Japanese Patent No. 4357064).

However, when silicone is filled with aluminum nitride having an average particle size of 3 μm or less at a high density, the viscosity of the material increases and moldability is reduced.

Patent Literature 3 (JP 2004-91743 A) discloses a thermally conductive grease that comprises spherical alumina having an average particle size of 0.2 to 1.0 μm and aluminum nitride having an average particle size of 1 to 3 μm and a maximum particle size of 2 to 10 μm to suppress an increase in viscosity. However, aluminum nitride has a small particle diameter and, therefore, it has the problem that it is difficult to provide a high thermal conduction.

Therefore, Patent Literature 4 (Japanese Patent No. 6246986) proposes a composition with high thermal conductivity that comprises aluminum nitride having an average particle size of 30 to 150 μm, aluminum nitride or alumina having an average particle size of 1 to 30 μm, and inorganic particles having an average particle size of 0.1 to 1 μm. However, the types and shapes of the inorganic particles, such as aluminum nitride, and a hardness when a silicone composition is formed into a cured product are not optimized and, therefore, it is difficult to provide a thermally conductive cured product having a high thermal conductivity and compressibility. Further, when compressibility is poor, it is difficult to fit a sheet in a tolerance for assembly or less, and the other components can potentially be damaged.

PRIOR LITERATURES

Patent Literatures

Patent Literature 1: Japanese Patent Application Laid-Open No. H03-14873 (1991)

Patent Literature 2: Japanese Patent No. 4357064

Patent Literature 3: Japanese Patent Application Laid-Open No. 2004-91743

Patent Literature 4: Japanese Patent No. 6246986

DISCLOSURE OF THE INVENTION

Problems to be Solved by the Invention

As described above, there is a requirement to provide a thermally conductive silicone sheet comprising aluminum nitride and having high thermal conductivity and excellent compressibility.

The present invention has been made to solve the above-described problem, and one of the objects the present invention to provide a cured product of a thermally conductive silicone composition having high thermal conductivity and excellent compressibility.

Solutions to the Problems

The present inventors have made research and found that a composition comprising unsintered-crushed aluminum nitride and alumina as a thermally conductive filler in a combination of a specific shape, average particle size and a volume ratio, easily provides a uniform thermally conductive silicone composition comprising an organopolysiloxane with no increasing viscosity in the preparation thereof. Furthermore, the present inventors found that a cured product obtained from the composition does not apply stress on a heat generating member, has a flexibility and compressibility that enables it to follow the fine, uneven shapes of a heat generating member or a cooling member, and has high thermal conductivity.

That is, the present invention provides a silicone composition comprising an organo(poly)siloxane and a thermally conductive filler, wherein

- the organo(poly)siloxane comprises at least one curable organo(poly)siloxane,
- the thermally conductive filler comprises (B-i) unsintered aluminum nitride having an average particle size of 20 μm or more and 120 μm or less and (B-ii) alumina having an average particle size of 0.1 μm or more and 5 μm or less,
- the (B-ii) alumina comprises spherical alumina with 25 to 80 mass % of the spherical alumina, based on a total mass of the component (B-ii),
- a proportion of the component (B-ii) is 25 to 50 mass %, based on a total mass of the components (B-i) and (B-ii), and
- a proportion of a volume of the thermally conductive filler is 80 to 90 volume %, based on a total volume of the silicone composition.

Effects of the Invention

According to the present invention, a silicone composition comprising a combination of unsintered-crushed aluminum nitride and alumina in a specific composition and volume ratio as a thermally conductive filler is suppressed increasing viscosity and easily provides a composition having uniform viscosity. A thermally conductive silicone-cured product obtained from the silicone composition of the present invention does not apply stress on a heat generating member, has a flexibility that enables it to follow the fine, uneven shapes of a heat generating member or a cooling member, and has high thermal conductivity. The cured product of the present composition has excellent compressibility, so that damage to elements caused during assembly is reduced. That is, the cured product of the present invention has excellent compressibility and high thermal conductivity. In particular, the present invention provides a cured product having a high thermal conductivity of 10 W/m·K or more.

DETAILED DESCRIPTION OF THE INVENTION

The present invention provides a silicone composition comprising an organo(poly)siloxane and a thermally conductive filler. The present invention will be described below in detail.

Organo(poly)siloxane is the base component of the thermally conductive silicone composition that provides the cured product of the present invention. Any organo(poly) siloxane may be used as long as it provides a cured product and the organo(poly)siloxane comprises at least one curable organo(poly)siloxane. The curable organo(poly)siloxane includes alkenyl group-containing organopolysiloxane, non-functional organopolysiloxane, alkoxy group-containing organopolysiloxane, and organohydrogenpolysiloxane. The organo(poly)siloxane may be used alone or in a combination of two or more of them. The organo(poly)siloxane may include an organopolysiloxane without an alkenyl group. The organo(poly)siloxane may optionally include an organosilane and may also include an organo(poly)siloxane and organosilane as a plasticizer or surface treating agent.

In the silicone composition of the present invention, a total proportion of organo(poly)siloxane and optional organosilane may be 10 to 20 volume %, and preferably 10 to 15 volume %, based on a total volume of the organo (poly)siloxane and component (B) described below.

[(B) Thermally Conductive Filler]

The present composition comprises the thermally conductive filler comprises (B-i) unsintered aluminum nitride having an average particle size of 20 μm or more and 120 μm or less and (B-ii) alumina having an average particle size of 0.1 μm or more and 5 μm or less. The (B-ii) alumina comprises spherical alumina with 25 to 80 mass % of the spherical alumina, based on a total mass of the component (B-ii), and a proportion of the component (B-ii) is 25 to 50 mass %, based on a total mass of the components (B-i) and (B-ii). A proportion of a volume of the thermally conductive filler is 80 to 90 volume %, based on a total volume of the silicone composition.

(B-i) Unsintered Aluminum Nitride

The thermally conductive silicone composition of the present invention comprises the (B-i) unsintered aluminum nitride as one of the thermally conductive fillers. Aluminum nitride is broadly divided into sintered bodies and unsintered bodies. Sintered bodies have spherical particles and more suitable for filling silicone polymers, compared with crushed unsintered bodies. On the other hand, sintered bodies are inferior to unsintered bodies in respect of thermal conductivity. This is because an aluminum nitride phase and an yttria phase exist together due to the addition of several percent of yttria to the aluminum nitride when sintering. Further, sintered bodies are extremely expensive due to having to perform the sintering process. Note that aluminum nitride is known to be easier to use in filling silicone polymers compared with boron nitride. Accordingly, unsintered aluminum nitride is required in the present invention.

The component (B-i) has an average particle size of 20 μm or more and 120 μm or less, preferably 30 to 110 μm, and more preferably 40 to 100 μm. Since aluminum nitride having such an average particle size has a small specific surface area, it is satisfactory in filling silicone, and a composition thereof is easily prepared. Aluminum nitride having the above-described average particle size allows both a heat transfer path to be ensured and a number of filler/resin interfaces to be reduced and, therefore, the thermal conductivity of a silicone resin cured product is advantageously improved.

Note that in the present invention, the average particle size is an average particle size based on volume and has a median diameter (d50) determined by a laser diffraction scattering method (measuring apparatus: Microtrac MT3000, produced by MicrotracBEL Corp.). An amount of fine powder having a particle size of 5 μm or less is calculated from the cumulative percentage of fine powder having a particle size of 5 μm or less of particle size cumulative distribution (based on volume) determined by the above apparatus.

(B-ii) Alumina

The (B-ii) alumina has various crystal phases such as α, β, θ, and γ, depending on a difference in sintering temperature. It is preferable to use α-alumina because the α-alumina is chemically stable at the highest sintering temperature. Further, while common alumina rarely exists in a single crystal phase, it is better that a proportion of the α-phase is as high as possible, and it is preferable to use a common alumina having an α conversion rate of 90% or more, and more preferably, 95% or more. Alumina has a variety of particle shapes depending on the production method, such as a spherical shape, a round shape, and a crushed shape. A crushed alumina is preferable because the crushed alumina typically has a high α conversion rate. Depending on the types and filling amounts of the other thermally conductive fillers, a silicone filling property and thermal conductivity is improved by including spherical alumina.

The component (B-ii) has an average particle size of 0.1 μm or more and 5 μm or less, preferably has an average particle size of 0.2 to 4 μm, and more preferably has an average particle size of 0.3 to 3 μm. The alumina having such an average particle size has a large specific surface area, so that an effect of a dispersant is sufficiently provided, filling property to a silicone is satisfactory, and the composition is easily prepared. Alumina having the above-described average particle size is less likely to obstruct a heat transfer path composed of aluminum nitride, thus thermal conductivity of the silicone resin cured product is advantageously improved.

In the thermally conductive silicone composition of the present invention, the (B-ii) alumina comprises spherical alumina at a specific proportion. The component (B-ii) is preferably spherical alumina and amorphous alumina. The amount of spherical alumina is 25 to 80 mass %, based on the total mass of alumina. Accordingly, an obtained cured product is more excellent in compressibility and has high thermal conductivity. The spherical alumina preferably has an average particle size of 0.1 μm or more and 2 μm or less. Accordingly, the obtained cured product is even more excellent in compressibility and has high thermal conductivity.

[Occupied Volume Ratio of the Thermally Conductive Filler]

The silicone composition of the present invention comprises the thermally conductive filler at 80 to 90 volume %, preferably at 80 to 87 volume %, based on the total volume of the composition. Sufficient thermal conductivity is not achieved at a lower volume % than the lower limit values above. Meanwhile, if the volume % is a higher than the upper limit, it is difficult to fill the thermally conductive filler to the silicone.

In the present invention, the amount of (B-ii) alumina is 25 to 50 mass %, preferably 30 to 45 mass %, and more preferably 35 to 40 mass %, based on the total mass of the components (B-i) and (B-ii). If the proportion of the component (B-ii) is less than the above lower limit values, it is difficult to fill alumina to the silicone. Meanwhile, sufficient thermal conductivity cannot be achieved if the proportion of the component (B-ii) is higher than the upper limit values above.

In the silicone composition of the present invention, an amount of spherical alumina in the component (B-ii) is 25 to 80 mass %, preferably 26 to 75 mass %, preferably 30 to 70 mass %, and more preferably 35 to 60 mass %, based on the total mass of alumina. Within that range, the thermally conductive filler and organopolysiloxane is uniformly combined (kneaded), and when a cured product is obtained, the cured product is even more excellent in compressibility and has high thermal conductivity. If the amount is less than the lower limit values above or higher than the upper limit values above, it is difficult to fill alumina to the silicone.

Particularly in compositions where the filling amount of the thermally conductive filler and the hardness of the sheet obtained are similar, a higher thermally conductive silicone-cured product excellent in compressibility is obtained especially when the amount of spherical alumina in the composition of the present invention is 35 to 60 mass %, based on the total alumina content. Therefore, such composition is especially preferable.

Note that the volume % of the (B) thermally conductive filler in the total volume of the silicone composition is determined by dividing a filling amount (based on volume) of each component by the total volume. The filling amount (based on volume) of each component is calculated from the filling amount (based on mass) of each component, that is, silicone (relative density: 1.00), aluminum nitride (relative density: 3.26), and alumina (relative density: 3.98), using a relative density thereof.

(A) Alkenyl Group-Containing Organopolysiloxane

The silicone composition of the present invention preferably comprises an (A) alkenyl group-containing organopolysiloxane in which the number of silicon atom-bonded alkenyl groups is two or more per molecule as the above-described curable organo(poly)siloxane. Organopolysiloxanes generally have a main chain basically formed from repeating units of diorganosiloxane. The organopolysiloxane may have a branched structure in a part of the molecular structure, or it may be cyclic. A linear diorganopolysiloxane is preferable in view of physical properties such as a mechanical strength of the cured product.

Alkenyl groups include, for example, alkenyl groups having 2 to 8 carbon atoms, and more specifically, a vinyl, allyl, propenyl, isopropenyl, butenyl, hexenyl, or cyclohexenyl group. Among these, lower alkenyl groups such as a vinyl or allyl group is preferred, and a vinyl group is particularly preferred.

Groups bonded to a silicon atom other than the alkenyl group may be unsubstituted or substituted hydrocarbon groups having 1 to 10 carbon atoms, preferably 1 to 6 carbon atoms. Examples of the group include alkyl groups, such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group, and a dodecyl group; cycloalkyl groups, such as a cyclopentyl group, a cyclohexyl group, and a cycloheptyl group; aryl groups, such as a phenyl group, a tolyl group, a xylyl group, a naphthyl group, and a biphenylyl group; aralkyl groups, such as a benzyl group, a phenylethyl group, a phenylpropyl group, and a methylbenzyl group; and those hydrocarbon groups wherein a part or all of the hydrogen atoms bonded to a carbon atom of these groups is substituted with a cyano group or a halogen atom such as fluorine, chlorine, and bromine. Examples of these kinds of substituted groups include a chloromethyl group, a 2-bromoethyl group, a 3-chloropropyl group, a 3,3,3-trifluoropropyl group, a chlorophenyl group, a fluorophenyl group, a cyanoethyl group, and a 3,3,4,4,5,5,6,6,6-nonafluorohexyl group. Typical examples of the hydrocarbon group include those having 1 to 10 carbon atoms, and particularly typical examples thereof include those having 1 to 6 carbon atoms. Preferable examples of the hydrocarbon group include unsubstituted or substituted alkyl groups having 1 to 3 carbon atoms, such as a methyl group, an ethyl group, a propyl group, a chloromethyl group, a bromoethyl group, a 3,3,3-trifluoropropyl group, and a cyanoethyl group; and unsubstituted or substituted phenyl groups, such as a phenyl group, a chlorophenyl group, and a fluorophenyl group. Further, the group other than the alkenyl group bonded to a silicon atom are not limited to all being the same. One such component (A) may be used, or a combination of two or more thereof (for example, those having different viscosities) may be used.

The (A) alkenyl group-containing organopolysiloxane preferably has a kinematic viscosity at 25° C. of 10 to 30000 $mm^2/s$, and is particularly preferably in a range of 50 to 1000 $mm^2/s$. When using an organopolysiloxane having a kinematic viscosity within this range, flowability of the obtained composition is not lost, and the thermally conductive filler may be filled easily.

The amount of the (A) alkenyl group-containing organopolysiloxane in the silicone composition may be 3 to 7 mass %, preferably 3 to 6 mass %, and more preferably 4 to 6 mass %, based on the total mass of the composition.

(C) Surface Treating Agent

The silicone composition of the present invention preferably comprises a surface treating agent. With the surface treating agent, the (B) thermally conductive filler was hydrophobized during preparation of the composition to improve wettability with the organopolysiloxane, so that the (B) thermally conductive filler is uniformly dispersed in a matrix of the organopolysiloxane. At least one selected from components (C-1) and (C-2) described below is particularly preferable as the surface treating agent. The component (C-1) and the component (C-2) are included in the above-described organopolysiloxane and organosilane.

The component (C-1) is an alkoxysilane compound represented by the following general formula (1).

$$R^2_aR^3_bSi(OR^4)_{4-a-b} \quad (1)$$

In the formula (1), $R^2$ is, independently of each other, an alkyl group having 6 to 15 carbon atoms, $R^3$ is, independently of each other, an unsubstituted or substituted group selected from an alkyl group having 1 to 5 carbon atoms, a cycloalkyl group having 4 to 8 carbon atoms, an aryl group having 6 to 12 carbon atoms, and an aralkyl group having 6 to 12 carbon atoms, $R^4$ is, independently of each other, an alkyl group having 1 to 6 carbon atoms, a is an integer of 1 to 3, and b is an integer of 0 to 2, provided that a+b is an integer of 1 to 3.

In the above-described general formula (1), $R^2$ is, independently of each other, an unsubstituted alkyl group having 6 to 15 carbon atoms. Examples of $R^2$ include a hexyl group, an octyl group, a nonyl group, a decyl group, a dodecyl group, and a tetradecyl group. When the number of carbon atoms in the alkyl group represented by $R^2$ satisfies the range of 6 to 15, the wettability of the thermally conductive filler with the organopolysiloxane is sufficiently enhanced, resulting in excellent handleability of the composition, and the composition has favorable characteristics at low temperatures.

$R^3$ is, independently of each other, an unsubstituted or substituted group selected from an alkyl group having 1 to 5 carbon atoms, a cycloalkyl group having 4 to 8 carbon atoms, an aryl group having 6 to 12 carbon atoms, and an aralkyl group having 6 to 12 carbon atoms. Examples of $R^3$ include alkyl groups, such as a methyl group, an ethyl group, a propyl group, an isopropyl group, a butyl group, an isobutyl group, a tert-butyl group, a pentyl group, and a neopentyl group; cycloalkyl groups, such as a cyclopentyl group, a cyclohexyl group, and a cycloheptyl group; aryl groups, such as a phenyl group, a tolyl group, a xylyl group, a naphthyl group, and a biphenylyl group; aralkyl groups, such as a benzyl group, a phenylethyl group, a phenylpropyl group, and a methylbenzyl group; and those hydrocarbon groups wherein a part or all of the hydrogen atoms bonded to a carbon atom of these groups is substituted with a cyano group or a halogen atom, such as fluorine, chlorine, and bromine. Examples of such substituted groups include a chloromethyl group, a 2-bromoethyl group, a 3-chloropropyl group, a 3,3,3-trifluoropropyl group, a chlorophenyl group, a fluorophenyl group, a cyanoethyl group, a 3,3,4,4,5,5,6,6,6-nonafluorohexyl group. Typical examples include ones having 1 to 10 carbon atoms, and particularly typical examples include ones having 1 to 6 carbon atoms. Preferable examples include unsubstituted or substituted alkyl groups having 1 to 3 carbon atoms, such as a methyl group, an ethyl group, a propyl group, a chloromethyl group, a bromoethyl group, a 3,3,3-trifluoropropyl group, and a cyanoethyl group; and unsubstituted or substituted phenyl groups, such as a phenyl group, a chlorophenyl group, and a fluorophenyl group.

Examples of $R^4$ include a methyl group, an ethyl group, a propyl group, a butyl group, and a hexyl group.

The component (C-2) is a dimethylpolysiloxane represented by the following general formula (2), with one terminal of a molecular chain blocked with a trialkoxy group.

(2)

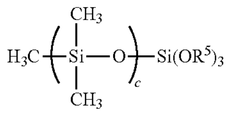

In the formula, $R^5$ is, independently of each other, an alkyl group having 1 to 6 carbon atoms, and c is an integer of 5 to 100. In the above-described general formula (2), the alkyl group represented by $R^5$ is the same kind of group as the alkyl group represented by $R^4$ in the above-described general formula (1).

Any one of the component (C-1) and the component (C-2) may be used alone, or both may be used in a combination, as the (C) surface treating agent. While the amount of the component (C) comprised in the silicone composition is not specifically limited, the amount is preferably 50 to 200 parts by mass, more preferably 50 to 170 parts by mass, and particularly preferably 50 to 150 parts by mass, relative to 100 parts by mass of the organopolysiloxane excluding the component (C). When the silicone composition comprises the above-described (A) alkenyl group-containing organopolysiloxane, the amount of the component (C) is preferably 50 to 200 parts by mass, more preferably 50 to 170 parts by mass, and particularly preferably 50 to 150 parts by mass, relative to 100 parts by mass of the (A) alkenyl group-containing organopolysiloxane. When the (C) surface treating agent is comprised within that range, the thermally conductive filler is uniformly dispersed in a matrix of the organopolysiloxane by sufficiently hydrophobizing the thermally conductive filler by the component (C) during preparation of the composition to improve wettability with the organopolysiloxane.

[Other Components]

In addition to the above-described components, other components may be further combined with the above-described silicone composition as necessary. For example, when the composition of the present invention is an addition reaction-curable composition or organic peroxide-curable composition comprising the above-described (A) alkenyl group-containing organopolysiloxane, an addition reaction curing agent or an organic peroxide curing agent may be added as a substance for promoting curing of the composition, according to the curing method described below. A more detailed description will be given below.

When the silicone composition of the present invention is an addition reaction-curable type, the composition further comprises a (D) organohydrogenpolysiloxane and an (E) platinum group metal catalyst. Examples of the (E) platinum group metal catalyst include a simple substance of a platinum element, a platinum compound, a platinum composite, a chloroplatinic acid, complexes of a chloroplatinic acid with an alcohol compound, an aldehyde compound, an ether compound, or various olefins. The amount of the platinum group metal catalyst may be an effective amount (catalytic amount) in progressing the addition reaction. For example, the amount to be added is such that the mass of platinum group metal atoms is preferably in a range of 1 to 2,000 ppm by mass, more preferably 2 to 1000 ppm by mass, relative to the (A) alkenyl group-containing organopolysiloxane.

The (D) organohydrogenpolysiloxane is an organohydrogenpolysiloxane having two or more hydrogen atoms each bonded to a silicon atom (SiH groups) in one molecule thereof. The SiH groups in the organohydrogenpolysiloxane hydrosilylation addition-reacted with the alkenyl groups bonded to the silicon atoms in the (A) alkenyl group-containing organopolysiloxane and work as a crosslinking agent. The molecular structure of this organohydrogenpolysiloxane is not particularly limited, and various conventionally used types such as linear, cyclic, branched chain, and three-dimensional network structures (resinous) is used. The organohydrogenpolysiloxane needs to have two or more hydrogen atoms bonded to a silicon atom (SiH groups) in one molecule thereof, preferably have 2 to 200 SiH groups, and more preferably 3 to 100 SiH groups. An addition-reaction controlling agent such as ethynyl methylidene carbinol may be further added. The amount of the organohydrogenpolysiloxane may be such that the ratio of the number of SiH groups to the number of alkenyl groups in the (A) alkenyl group-containing organopolysiloxane is 0.3 to 2.0, and preferably 0.5 to 1.0.

When the silicone composition of the present invention is an organic peroxide-curable type, an (F) organic peroxide is comprised. Examples of the organic peroxide include benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)hexane, di-t-butyl peroxide, t-butyl perbenzoate, and 1,6-hexanediol-bis-t-butylperoxy carbonate. These may be used alone or in a combination of two or more of them.

The amount of the organic peroxide may be an amount sufficient for curing the above-described composition, and is generally 0.1 to 10 parts by mass, and particularly preferably 0.2 to 5 parts by mass, relative to 100 parts by mass of the alkenyl group-containing organopolysiloxane.

One of the preferred aspects of the present invention is the addition reaction-curable silicone composition described below.

The addition reaction-curable silicone composition is a silicone composition comprising the organo(poly)siloxane and the thermally conductive filler, wherein the organo(poly)siloxane comprises at least one curable organo(poly)siloxane, the thermally conductive filler comprises (B-i) unsintered aluminum nitride having an average particle size of 20 μm or more and 120 μm or less and (B-ii) alumina having an average particle size of 0.1 μm or more and 5 μm or less, the (B-ii) alumina comprises spherical alumina with 25 to 80 mass % of the spherical alumina, based on a total mass of the component (B-ii), a proportion of the component (B-ii) is 25 to 50 mass %, based on a total mass of the components (B-i) and (B-ii), and a proportion of a volume of the thermally conductive filler is 80 to 90 volume %, based on a total volume of the silicone composition.

The addition reaction-curable silicone composition comprises an (A) alkenyl group-containing organopolysiloxane and a (D) organohydrogenpolysiloxane as the curable organo(poly)siloxane, and further comprises an (E) platinum group metal catalyst.

The addition reaction-curable silicone composition preferably comprises the above-described (C) surface treating agent in an amount of 50 to 200 parts by mass, preferably 50 to 170 parts by mass, and more preferably 50 to 150 parts by mass, relative to 100 parts by mass of the (A) alkenyl group-containing organopolysiloxane.

The other one of preferred aspects of the present invention is the organic peroxide-curable silicone composition described below.

The organic peroxide-curable silicone composition is a silicone composition comprising the organo(poly)siloxane and the thermally conductive filler, wherein the organo(poly)siloxane comprises at least one curable organo(poly)siloxane, the thermally conductive filler comprises (B-i) unsintered aluminum nitride having an average particle size of 20 μm or more and 120 μm or less and (B-ii) alumina having an average particle size of 0.1 μm or more and 5 μm or less, the (B-ii) alumina comprises spherical alumina with 25 to 80 mass % of the spherical alumina, based on a total mass of the component (B-ii), a proportion of the component (B-ii) is 25 to 50 mass %, based on a total mass of the components (B-i) and (B-ii), and a proportion of a volume of the thermally conductive filler is 80 to 90 volume %, based on a total volume of the silicone composition.

The organic peroxide-curable silicone composition comprises an (A) alkenyl group-containing organopolysiloxane as the curable organopolysiloxane and further comprises an (F) organic peroxide.

The organic peroxide-curable silicone composition preferably comprises the above-described (C) surface treating agent in an amount of 50 to 200 parts by mass, preferably 50 to 170 parts by mass, and is more preferably 50 to 150 parts by mass, relative to 100 parts by mass of the (A) alkenyl group-containing organopolysiloxane.

[Preparation of Composition]

Methods for preparing the silicone composition are not particularly limited, and the composition is obtained by kneading predetermined amounts of the above-described components using a known kneading apparatus such as, for example, two rollers, a kneader, or a Banbury mixer. A heat treatment (kneading under heating) may be performed as necessary.

[Molding and Curing Methods]

The method for molding the above-described composition may be selected according to the required usage (molding). Examples include compression molding, injection molding, transfer molding, hot-air vulcanization under normal pressure, or steam vulcanization.

Examples of the curing method of the silicone composition include a method using a platinum-based catalyst and the addition reaction of the alkenyl groups of the component (A) and Si—H groups, a method using peroxide, and a method employing a condensation reaction. In the present invention, the curing method is not particularly limited, as long as the curing proceeds. A curing component can be added as necessary.

In the case where a platinum-based catalyst, an organopolysiloxane comprising alkenyl groups, and an organopolysiloxane having hydrogen atoms directly bonded to silicon are present together in the curing method using an addition reaction, an addition reaction takes place, and a silethylene chain is formed. A net-like crosslinked structure is formed by the addition reaction, and curing proceeds. In the curing method using peroxide, a radical is generated from the peroxide by heat or light due to adding peroxide and becomes an initiator and, then, organopolysiloxanes bond to each other and curing proceeds. In the curing method employing a condensation reaction, an organopolysiloxane having a silanol group, a silane having a hydrolysable group, and a tin-based catalyst are required components. Water in the air becomes an initiator, crosslinking of the organopolysiloxane is formed, and curing proceeds.

In any reaction, the curing conditions are not particularly limited and may be appropriately selected according to the curing method or molding. The curing conditions are generally 80 to 600° C., and more particularly 100 to 450° C., for about several seconds to several days, and more particularly about 5 seconds to 1 hour. A secondary vulcanization may be performed as necessary. A secondary vulcanization is generally performed at 180 to 250° C. for about 1 to 10 hours.

The cured product of the present invention is, for example, disposed between a heat-generating component and a heat-dissipating component in an electronic device and used for heat dissipation. Therefore, the cured product preferably has the following thermal conductivity and hardness.

[Thermal Conductivity]

Thermal conductivity is preferably 10 W/m·K or more, and is more preferably 11 W/m·K or more. In the case where thermal conductivity is 10 W/m·K or more, the cured product has excellent thermal conductivity as a heat-dissipating member. Note that thermal conductivity is determined using a TPA-501, produced by Kyoto Electronics Manufacturing Co., Ltd.

[Hardness]

An Asker C hardness of the cured product of the silicone composition is preferably 50 or less, more preferably 5 or more and 50 or less, and particularly preferably 5 or more and 45 or less. When the Asker C hardness is 50 or less, no stress is applied to the heat-generating component when mounting, the cured product follows the fine, uneven shapes of the heat-generating component or cooling component, and there is no degradation in thermal contact resistance. When the Asker C hardness is 5 or more, handling during mounting becomes easier, and there are no concerns regarding deformation or tearing of the cured product.

The cured product of the silicone composition of the present invention is widely used as a thermally conductive material that is placed at an interface between a thermal boundary surface of a heat-generating electronic component and a heat-dissipating member, such as a heat sink or a circuit board, for the purpose of cooling the electronic component by thermal conduction.

EXAMPLES

The present invention will be explained below in further detail with reference to a series of the Examples and the Comparative Examples, though the present invention is in no way limited by these Examples.

[Preparation of Composition]

Components (A) to (F) used in the following Examples and Comparative Examples are shown below.

Note that the average particle size is a median diameter (d50) determined by a laser diffraction scattering method (measuring apparatus: Microtrac MT3000, produced by Microtrac BEL Corp.) and the amount of fine powder having a particle size of 5 μm or less was calculated from the cumulative percentage of fine powder having a particle size of 5 μm or less of particle size cumulative distribution (based on volume) determined by the above apparatus.

An occupancy volume (ratio) of the component (B) in the composition in the tables is a value (volume %) calculated by dividing the filling amount (based on volume) by the total volume. The filling amount (based on volume) of each component is calculated from the filling amount (based on mass) of each component, that is, silicone (relative density: 1.00), aluminum nitride (relative density: 3.26), and alumina (relative density: 3.98), using a relative density thereof.

Component (A):

(A-1) Organopolysiloxane (relative density: 1.00) represented by the following formula (a) and having a viscosity of 100 $mm^2/s$.

(A-2) Organopolysiloxane (relative density: 1.00) represented by the above formula (a) and having a viscosity of 400 $mm^2/s$.

(a)

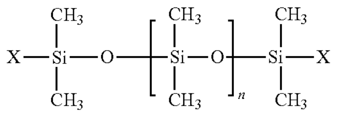

X is a vinyl group and n is a value such that the organopolysiloxane has the aforesaid viscosity.

Component (B):

(B-1) Unsintered crushed aluminum nitride having an average particle size of 20 μm (B-2) Unsintered crushed aluminum nitride having an average particle size of 60 μm (B-3) Unsintered crushed aluminum nitride having an average particle size of 80 μm (B-4) Spherical alumina having an average particle size of 10 μm (B-5) Crushed alumina having an average particle size of 3 μm (B-6) Spherical alumina having an average particle size of 0.2 μm (C) Surface Treating Agent:

Dimethylpolysiloxane (relative density: 1.00) represented by the following formula, with an average polymerization degree of 30 and one terminal blocked with a trimethoxysilyl group.

(3)

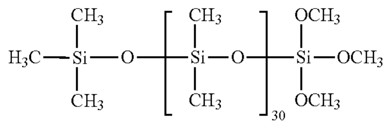

(D) Hydrogenpolysiloxane (Relative Density: 1.00):

A mixture of the following component (D-1) and component (D-2) with a mass ratio (D-1):(D-2)=0.2:10

(D-1) Hydrogenpolysiloxane represented by the following formula, with the following average polymerization degree.

(4)

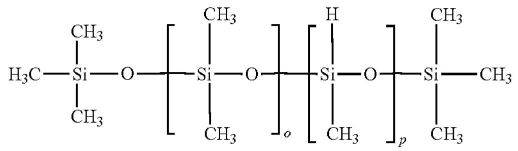

o=27, p=3

(D-2) Hydrogenpolysiloxane represented by the following formula, with the following average polymerization degree.

(5)

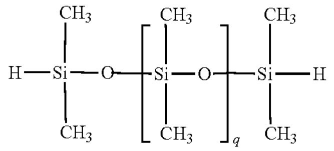

q=18

(E) Platinum Group Metal Catalyst: A 2-Ethylhexanol Solution Containing 5% Chloroplatinic Acid (Relative Density: 0.90)

(G) Addition-Reaction Controlling Agent:Ethynyl Methylidene Carbinol (Relative Density: 0.90)

Examples 1 to 6 and Comparative Examples 1 to 7

The components (A) to (C) were kneaded with a planetary mixer at room temperature for 60 minutes in the respective formulation amounts (parts by mass) described in the following Tables 1 and 2, further vacuum kneaded at 180° C. for 60 minutes and, then, cooled to room temperature. Then, the components (D), (E), and (G) were added thereto and further kneaded to obtain the silicone composition. Note that the formulation amounts of the components in the tables are in parts by mass.

[Molding Method]

The obtained composition was poured into a metal mold and molded (cured) with a press molding machine at 110° C. for 10 minutes.

[Evaluation Method]

Thermal conductivity: the obtained composition was cured into a sheet having a thickness of 6 mm, the thermal conductivity of two of such sheets was determined by a thermal conductivity meter (product name: TPA-501, produced by Kyoto Electronics Manufacturing Co., Ltd.).

Hardness: the obtained composition was cured into a sheet having a thickness of 6 mm, two of such sheets was stacked and the hardness was determined by an Asker C Hardness Meter.

Compressive stress: the obtained composition was cured into a sheet having a thickness of 6 mm. One such sheet was compressed at a speed of 1 mm/min until the thickness became 4 mm. A stress change (reactive force when pressure was applied to the sheet) was determined with a desktop precision universal testing machine (product name: AG-5kNXPlus, produced by Shimadzu Corporation).

TABLE 1

| Component, | | Example | | | | | |
|---|---|---|---|---|---|---|---|
| part by mass | | 1 | 2 | 3 | 4 | 5 | 6 |
| (A) | (A-1) Organopolysiloxane | 43 | 43 | 43 | | | 50 |
| | (A-2) Organopolysiloxane | 57 | 57 | 57 | 100 | 100 | 50 |
| (B) | (B-1) Unsintered crushed aluminum nitride having an average particle size of 20 μm | | | | 595 | | 1662 |
| | (B-2) Unsintered crushed aluminum nitride having an average particle size of 60 μm | 2766 | 2766 | 2766 | 2143 | | 811 |
| | (B-3) Unsintered crushed aluminum nitride having an average particle size of 80 μm | | | | | 2660 | 405 |
| | (B-4) Spherical alumina having an average particle size of 10 μm | | | | | | |
| | (B-5) Crushed alumina having an average particle size of 3 μm | 1193 | 851 | 510 | 1667 | 532 | 1622 |
| | (B-6) Spherical alumina having an average particle size of 0.2 μm | 510 | 852 | 1193 | 595 | 426 | 1216 |
| (C) Surface Treating Agent | | 116 | 116 | 116 | 141 | 115 | 60 |
| (D) Hydrogenpolysiloxane | | 12 | 12 | 12 | 13 | 9 | 15 |
| (E) Platinum Group Metal Catalyst | | 2 | 2 | 2 | 3 | 2 | 3 |
| (G) Addition-Reaction Controlling Agent | | 0.5 | 0.5 | 0.5 | 0.6 | 0.4 | 0.6 |
| Percentage of the thermally conductive | | 84.6 | 84.6 | 84.6 | 84.4 | 82.2 | 89.8 |

TABLE 1-continued

| Component, part by mass | Example 1 | 2 | 3 | 4 | 5 | 6 |
|---|---|---|---|---|---|---|
| filler in the composition, % by volume | | | | | | |
| Proportion of alumina in the total thermally conductive filler, % by mass | 38.1 | 38.1 | 38.1 | 45.2 | 26.5 | 49.7 |
| Percentage of spherical alumina in the total alumina, % by mass | 29.9 | 50.0 | 70.1 | 26.3 | 44.5 | 42.8 |
| Asker C hardness | 45 | 45 | 45 | 25 | 23 | 48 |
| Thermal conductivity, W/mK | 13 | 13 | 13 | 10.6 | 10.2 | 13.6 |
| Compressive stress, MPa | 0.72 | 0.51 | 0.63 | 0.06 | 0.03 | 0.9 |

TABLE 2

| | Component part by mass | Comparative Example 1 | 2 | 3 | 4 | 5 | 6 | 7 |
|---|---|---|---|---|---|---|---|---|
| (A) | (A-1)Organopolysiloxane | 43 | 43 | 43 | | | | 50 |
| | (A-2)Organopolysiloxane | 57 | 57 | 57 | 100 | 100 | 100 | 50 |
| (B) | (B-1) Unsintered crushed aluminum nitride having an average particle size of 20 μm | | | | 595 | 489 | | 1906 |
| | (B-2) Unsintered crushed aluminum nitride having an average particle size of 60 μm | 2766 | 2766 | 2766 | 2143 | 1761 | | 930 |
| | (B-3) Unsintered crushed aluminum nitride having an average particle size of 80 μm | | | | | | 2758 | 464 |
| | (B-4) Spherical alumina having an average particle size of 10 μm | 300 | | | | | | |
| | (B-5) Crushed alumina having an average particle size of 3 μm | 851 | 1448 | 255 | 1722 | 2027 | 478 | 1886 |
| | (B-6) Spherical alumina having an average particle size of 0.2 μm | 552 | 255 | 1448 | 540 | 723 | 382 | 1414 |
| | (C) Surface Treating Agent | 116 | 116 | 116 | 141 | 141 | 115 | 60 |
| | (D) Hydrogenpolysiloxane | 12 | 12 | 12 | 13 | 13 | 9 | 15 |
| | (E) Platinum Group Metal Catalyst | 2 | 2 | 2 | 3 | 3 | 2 | 3 |
| | (G) Addition-Reaction Controlling Agent | 0.5 | 1 | 1 | 0.6 | 1 | 0.4 | 0.6 |
| | Percentage of the thermally conductive filler in the composition, % by volume | 84.6 | 84.6 | 84.6 | 84.4 | 84.0 | 82.2 | 91.0 |
| | Proportion of alumina in the total thermally conductive filler, % by mass | 38.1 | 38.1 | 38.1 | 45.2 | 55.0 | 23.8 | 50.0 |
| | Percentage of spherical alumina in the total alumina, % by mass | 39.3 | 15.0 | 85.0 | 23.9 | 26.3 | 44.4 | 42.8 |
| | Asker C hardness | — | — | — | 22 | 20 | — | — |
| | Thermal conductivity, W/mK | — | — | — | 9.8 | 9.8 | — | — |
| | Compressive stress, MPa | — | — | — | 0.03 | 0.05 | — | — |

The silicone compositions of Examples 1 to 6 were easily mixed, and their cured products were excellent in compressibility and were favorable in hardness and high thermal conductivity. In particular, comparing the cured products of the silicone compositions of Examples 1 to 3, in which the spherical alumina was mixed in the respective contents of 30 to 70 mass % based on the total amount of alumina and the hardness was similar, the cured product obtained from the composition of Example 2 in which the amount of spherical alumina was 50 mass % based on the total amount of alumina had a compressive stress of 0.51 MPa. Thus, the cured product of Example 2 had the most satisfactory compressibility of 50 mass % when the composition was formed into a cured product. Further, the proportion of alumina in the whole thermally conductive filler was 25 to 50 mass % in Examples 1 to 6 and, thereby, a balance between the combined alumina and aluminum nitride was appropriate and the cured product of the silicone composition exhibited sufficient thermal conductivity.

In Comparative Example 1, in which a portion of the spherical alumina used in Example 1 was changed to spherical alumina (B-4) having an average particle size of 10 μm, the thermally conductive filler was not filled with the silicone and separated and, thereby, a cured product of the silicone composition was not obtained.

Also, in Comparative Example 2, in which the proportion of the spherical alumina used in Example 1 was reduced to 15 mass % of the whole alumina content, it was difficult to fill the thermally conductive filler in the silicone and, thereby, no composition was obtained and the cured product of the silicone composition was not produced. Furthermore, in Comparative Example 3, in which the proportion of the spherical alumina used in Example 1 was increased to 85 mass % of the whole alumina content, it was also difficult to fill the thermally conductive filler in the silicone and, thereby, no composition was obtained and the cured product of the silicone composition was not produced. Also, in Comparative Example 4, in which the proportion of the spherical alumina used in Example 4 was reduced to 24 mass % of the whole alumina content, the cured product of the silicone composition did not exhibit sufficient thermal conductivity.

The cured product of Comparative Example 5, in which the proportion of alumina was increased to 55 mass % in the thermally conductive filler, did not exhibit sufficient thermal conductivity due to an excessively small proportion of aluminum nitride. When the proportion of alumina was reduced to 24 mass % in the whole thermally conductive filler, such as in Comparative Example 6, the surface treating agent did not work effectively, so that the thermally conductive filler was not filled in the silicone. Furthermore, in the cured product of Comparative Example 7, in which the volume percent of the thermally conductive filler was increased to 91 volume %, the filling amount of the filler was excessively large, so that it was difficult to fill the thermally conductive filler in the silicone and no composition was obtained.

As described above, in the silicone compositions not satisfying the constitutes of the present invention, it is difficult to fill the thermally conductive filler in the silicone, so that a cured product having high thermal conductivity is not provided.

The cured product of the silicone composition of the present invention is suitably used as a thermally conductive resin molded product that is disposed between a heat-generating component and a heat-dissipating component in an electronic device and used for heat dissipation. More specifically, the cured product is useful as a thermally conductive material placed at an interface between a thermal boundary surface of a heat-generating electronic component and a heat-dissipating member such as a heat sink or a circuit board to cool electronic components by thermal conduction.

The invention claimed is:

1. A silicone composition comprising an organo(poly) siloxane and a thermally conductive filler, wherein the organo(poly) siloxane comprises at least one curable organo(poly)siloxane, the thermally conductive filler comprises (B-i) unsintered aluminum nitride having an average particle size of 20 μm or more and 120 μm or less and (B-ii) alumina having an average particle size of 0.1 μm or more and 5 μm or less, the (B-ii) alumina comprises spherical alumina with 25 to 80 mass % of the spherical alumina, based on a total mass of the component (B-ii), wherein the spherical alumina has an average particle size of 0.1 μm or more and 2 μm or less, a proportion of the component (B-ii) is 25 to 50 mass %, based on a total mass of the components (B-i) and (B-ii), and a proportion of a volume of the thermally conductive filler is 80 to 90 volume %, based on a total volume of the silicone composition.

2. The silicone composition according to claim 1, wherein the thermally conductive silicone composition further comprises a (C) surface treating agent, and the surface treating agent is at least one selected from a (C-1) alkoxysilane represented by the following general formula (1):

$$R^2_aR^3_bSi(OR^4)_{4-a-b} \quad (1)$$

wherein $R^2$ is, independently of each other, an alkyl group having 6 to 15 carbon atoms, $R^3$ is, independently of each other, a group selected from an unsubstituted or substituted alkyl group having 1 to 5 carbon atoms, a cycloalkyl group having 4 to 8 carbon atoms, an aryl group having 6 to 12 carbon atoms, and an aralkyl group having 6 to 12 carbon atoms, $R^4$ is, independently of each other, an alkyl group having 1 to 6 carbon atoms, a is an integer of 1 to 3, and b is an integer of 0 to 2, provided that a+b is an integer of 1 to 3, and a (C-2) dimethylpolysiloxane represented by the following general formula (2):

(2)

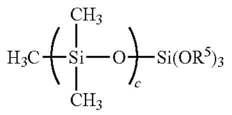

wherein $R^5$ is, independently of each other, an alkyl group having 1 to 6 carbon atoms, and c is an integer of 5 to 100.

3. The silicone composition according to claim 1, wherein the at least one curable organo(poly) siloxane comprises an (A) alkenyl group-containing organopolysiloxane.

4. The silicone composition according to claim 2, wherein the at least one curable organo(poly) siloxane comprises an (A) alkenyl group-containing organopolysiloxane, and wherein an amount of the (C) surface treating agent is 50 to 200 parts by mass, relative to 100 parts by mass of the (A) alkenyl group-containing organopolysiloxane.

5. A thermally conductive silicone-cured product of curing the silicone composition according to claim 1.

6. The thermally conductive silicone-cured product according to claim 5, having thermal conductivity of 10 W/m K or more.

7. The thermally conductive silicone-cured product according to claim 5, having an Asker C hardness of 50 or less.

8. The silicone composition according to claim 1, wherein the thermally conductive silicone composition further comprises a (C) surface treating agent, and the surface treating agent is at least one selected from a (C-1) alkoxysilane represented by the following general formula (1):

$$R^2_aR^3_bSi(OR^4)_{4-a-b} \quad (1)$$

wherein $R^2$ is, independently of each other, an alkyl group having 6 to 15 carbon atoms, $R^3$ is, independently of each other, a group selected from an unsubstituted or substituted alkyl group having 1 to 5 carbon atoms, a cycloalkyl group having 4 to 8 carbon atoms, an aryl group having 6 to 12 carbon atoms, and an aralkyl group having 6 to 12 carbon atoms, $R^4$ is, independently of each other, an alkyl group having 1 to 6 carbon atoms, a is an integer of 1 to 3, and b is an integer of 0 to 2, provided that a+b is an integer of 1 to 3, and a (C-2) dimethylpolysiloxane represented by the following general formula (2):

(2)

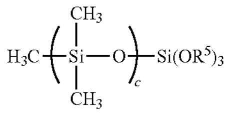

wherein $R^5$ is, independently of each other, an alkyl group having 1 to 6 carbon atoms, and c is an integer of 5 to 100.

9. The silicone composition according to claim 8, wherein the at least one curable organo(poly) siloxane comprises an (A) alkenyl group-containing organopolysiloxane.

10. The silicone composition according to claim 2, wherein the at least one curable organo(poly) siloxane comprises an (A) alkenyl group-containing organopolysiloxane.

11. A thermally conductive silicone-cured product of curing the silicone composition according to claim 2.

12. A thermally conductive silicone-cured product of curing the silicone composition according to claim 3.

13. A thermally conductive silicone-cured product of curing the silicone composition according to claim 4.

14. A thermally conductive silicone-cured product of curing the silicone composition according to claim 8.

15. A thermally conductive silicone-cured product of curing the silicone composition according to claim 9.

16. A thermally conductive silicone-cured product of curing the silicone composition according to claim 10.

* * * * *